United States Patent
Calman et al.

(10) Patent No.: US 8,942,684 B2
(45) Date of Patent: Jan. 27, 2015

(54) ADAPTIVE SCAFFOLDING OF LEVELS OF CONNECTIVITY DURING A CONFERENCE

(71) Applicant: Bank of America Corporation, Charlotte, NC (US)

(72) Inventors: Matthew A. Calman, Charlotte, NC (US); Alicia C. Jones, Fort Mill, SC (US); Elizabeth S. Votaw, Potomac, MD (US); Rajat Agrawal, Sunnyvale, CA (US); Wanwen Han, Jersey City, NJ (US); Su Liu, Pittsburgh, PA (US); Nir Rachmel, Brookline, MA (US); Lin Streja, Pittsburgh, PA (US); Cameron Park-Hur, Castro Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 96 days.

(21) Appl. No.: 13/651,798

(22) Filed: Oct. 15, 2012

(65) Prior Publication Data

US 2014/0106721 A1   Apr. 17, 2014

(51) Int. Cl.
 *H04W 4/16* (2009.01)
 *H04M 3/58* (2006.01)

(52) U.S. Cl.
 USPC .......................................... 455/416; 455/417

(58) Field of Classification Search
 CPC .. G06Q 20/108; G06Q 20/204; G06Q 20/202
 See application file for complete search history.

(56) References Cited

U.S. PATENT DOCUMENTS

| | | | |
|---|---|---|---|
| 7,742,584 B2* | 6/2010 | Chatterjee et al. | 379/201.01 |
| 2007/0039025 A1 | 2/2007 | Kraft et al. | |
| 2009/0061831 A1* | 3/2009 | Shastry | 455/414.1 |
| 2010/0274859 A1* | 10/2010 | Bucuk | 709/206 |
| 2011/0109715 A1 | 5/2011 | Jing et al. | |
| 2011/0167123 A1* | 7/2011 | Coskun et al. | 709/206 |
| 2012/0072340 A1* | 3/2012 | Amron | 705/39 |
| 2012/0170728 A1* | 7/2012 | Wengrovitz et al. | 379/93.21 |
| 2012/0221464 A1* | 8/2012 | Pasquero et al. | 705/39 |
| 2012/0289213 A1* | 11/2012 | Levien et al. | 455/417 |

* cited by examiner

*Primary Examiner* — Vladimir Magloire
*Assistant Examiner* — Frank Donado
(74) *Attorney, Agent, or Firm* — Michael A. Springs; Moore & Van Allen PLLC; Nicholas C. Russell

(57) ABSTRACT

Systems, methods, and computer program products for adaptively scaffolding of levels of connectivity between one or more customer devices during customer service conference are provided. The system includes various applications and features executable on a computing and/or mobile computing device. The system includes a user interface configured to present tools and features that allows a customer, during a digital conference with a bank representative, to manipulate the channels of communication, levels of connectivity or other features of the digital conference. In some instances, a scaffolding application on the bank's server may be provided to dynamically adjust the levels of connectivity and/or channels of communication of an ongoing digital conference session between a customer and a bank representative based on prior conferences involving the customer and/or a bank representative. As such, the system allows for self-directed and/or computer-aided adjustment of levels of connectivity during a conference.

20 Claims, 4 Drawing Sheets

ADAPTIVE SCAFFOLDING OF LEVELS OF CONNECTIVITY DURING A CONFERENCE

BACKGROUND

In some circumstances customers of a financial institution desire to interact with a representative of a financial institution for answering or resolving matters related to products and/or services related to the financial institution. In such circumstances a customer may have to visit a local branch of the financial institution, call a representative via telephone, or communicate via text based communication. Although customers may find using these examples method of communicating with a representative of a financial institution helpful, in some instances, customer prefer a more dynamic conferencing experience that may include different or more than one customer computing devices with features for control how the conference is conducted.

Therefore, there is a need for providing customers of a financial institution tools and technology for enhancing the customer conferencing experience with a representative of the financial institution.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, some embodiments of the present invention provide a system having a communication interface, a network, and a processing device in communication with the network and communication interface, wherein the processing device is configured to: (a) use a first customer computing device to communicate with a representative system to thereby establish a first connection, wherein the first connection enables the customer to interact with a representative of a financial institution by exchanging conference data, wherein a portion of the conference data corresponds to at least one medium of communication; (b) identify a second customer computing device to thereby establish a second connection such that the second customer computing device and the representative system are in communication; and (c) transmit the portion of the conference data corresponding to the at least one medium of communication to the second customer computing device so that the second customer computing device and the representative system are in communication based at least partially on the identifying the second customer computing device.

In one embodiment, the system receives input from the customer for initiating the transmission of the portion of the conference data corresponding to the at least one medium of communication to the second customer computing device.

In one embodiment, the system automatically transmits the portion of the conference data corresponding to the at least one medium of communication to the second customer computer based on pre-established customer preferences.

In one embodiment, the system adds a new medium of communication to the conference data such that the first customer computing device or the second customer computing device is in communication with the representative system in a new way or removes a prior medium of communication existing in the conference data such that the first customer computing device or the second customer computing device can no longer use the prior medium of communication to communicate with the representative system.

In one embodiment, the system automatically transmits the entire conference data including the portion of the conference data corresponding to the at least one medium of communication to the second customer computing device such that conference data is only exchanged in the second connection and not in the first connection.

In one embodiment, the system uses the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

In one embodiment of the system, the at least one medium of communication comprises at least one of an audio communication, a video communication, a textual communication, image communication, code communication, or tactile communication.

Still other embodiments provide a computer-implemented method providing a computer processor configured to: (a) use a first customer computing device to communicate with a representative system to thereby establish a first connection, wherein the first connection enables the customer to interact with a representative of a financial institution by exchanging conference data, wherein a portion of the conference data corresponds to at least one medium of communication; (b) identify a second customer computing device to thereby establish a second connection such that the second customer computing device and the representative system are in communication; and (c) transmit the portion of the conference data corresponding to the at least one medium of communication to the second customer computing device so that the second customer computing device and the representative system are in communication based at least partially on the identifying the second customer computing device.

In one embodiment of the computer-implemented method, the at least one medium of communication comprises at least one of an audio communication, a video communication, a textual communication, image communication, code communication, or tactile communication and the computer-implemented method receives input from the customer for initiating the transmission of the portion of the conference data corresponding to the at least one medium of communication to the second customer computing device.

In one embodiment of the computer-implemented method, the computer-implement method automatically transmits the portion of the conference data corresponding to the at least one medium of communication to the second customer computing device based on pre-established customer preferences.

In one embodiment of the computer-implemented method, the computer-implement method adds a new medium of communication to the conference data such that the first customer computing device or the second customer computing device is in communication with the representative system in a new way or removes a prior medium of communication existing in the conference data such that the first customer computing device or the second customer computing device can no longer use the prior medium of communication to communicate with the representative system.

In one embodiment of the computer-implemented method, the computer-implement method automatically transmits the entire conference data including the portion of the conference data corresponding to the at least one medium of communication to the second customer computing device such that conference data is only exchanged in the second connection and not in the first connection.

In one embodiment of the computer-implemented method, the computer-implement method uses the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

In one embodiment of the computer-implemented method, the computer-implement method transmits the portion of the conference data corresponding to the at least one medium of communication back to the first connection involving the first customer computing device.

Other embodiments of the present invention provide a computer program product having a non-transitory computer-readable medium, wherein the non-transitory computer-readable medium includes one or more computer-executable program code portions that when executed by a computer, cause the computer to: (a) use a first customer computing device to communicate with a representative system to thereby establish a first connection, wherein the first connection enables the customer to interact with a representative of a financial institution by exchanging conference data, wherein a portion of the conference data corresponds to at least one medium of communication; (b) identify a second customer computing device to thereby establish a second connection such that the second customer computing device and the representative system are in communication; and (c) transmit the portion of the conference data corresponding to the at least one medium of communication to the second customer computing device so that the second customer computing device and the representative system are in communication based at least partially on the identifying the second customer computing device.

In one embodiment of the computer program product, the computer program product when executed causes the computer to automatically transmit the portion of the conference data corresponding to the at least one medium of communication to the second customer computing device based on pre-established customer preferences.

In one embodiment of the computer program product, the computer program product when executed causes the computer to add a new medium of communication to the conference data such that the first customer computing device or the second customer computing device is in communication with the representative system in a new way or remove a prior medium of communication existing in the conference data such that the first customer computing device or the second customer computing device can no longer use the prior medium of communication to communicate with the representative system.

In one embodiment of the computer program product, the computer program product when executed causes the computer to automatically transmit the entire conference data including the portion of the conference data corresponding to the at least one medium of communication to the second customer computing device such that conference data is only exchanged in the second connection and not in the first connection.

In one embodiment of the computer program product, the computer program product when executed causes the computer to use the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

BRIEF DESCRIPTION OF THE DRAWINGS

Figure 1:
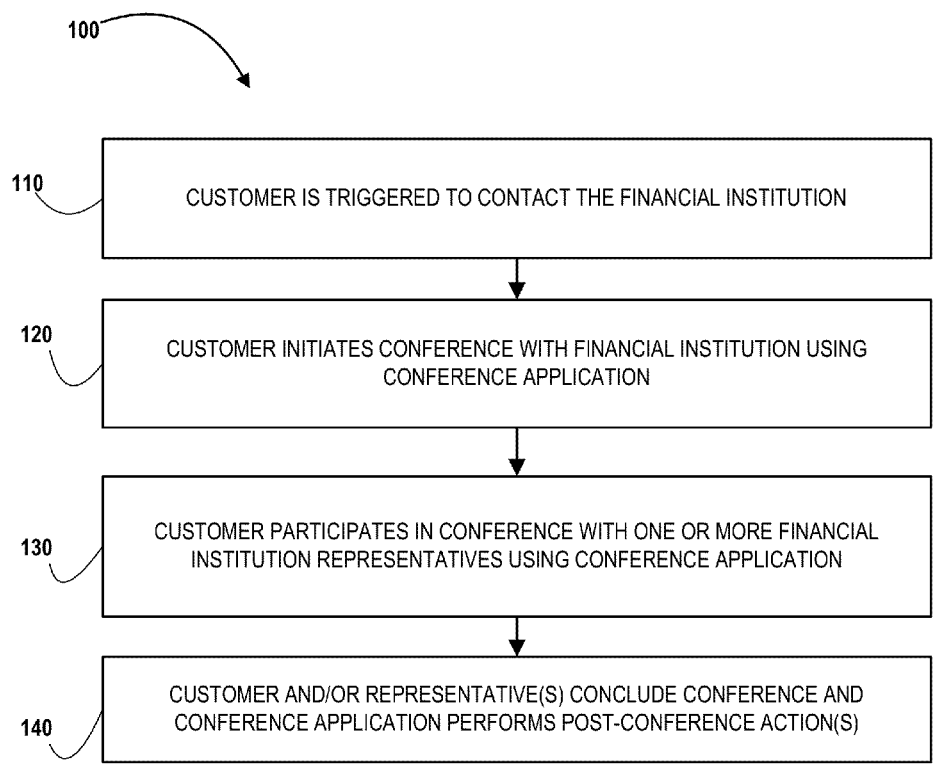

Having thus described embodiments of the invention in general terms, reference will now be made to the accompanying drawings, which are not necessarily drawn to scale, and wherein:

FIG. 1 illustrates a general process flow of an embodiment for representing the fundamental stages of a customer's interaction with the financial institution, in accordance with some embodiments of the present invention.

Figure 2:
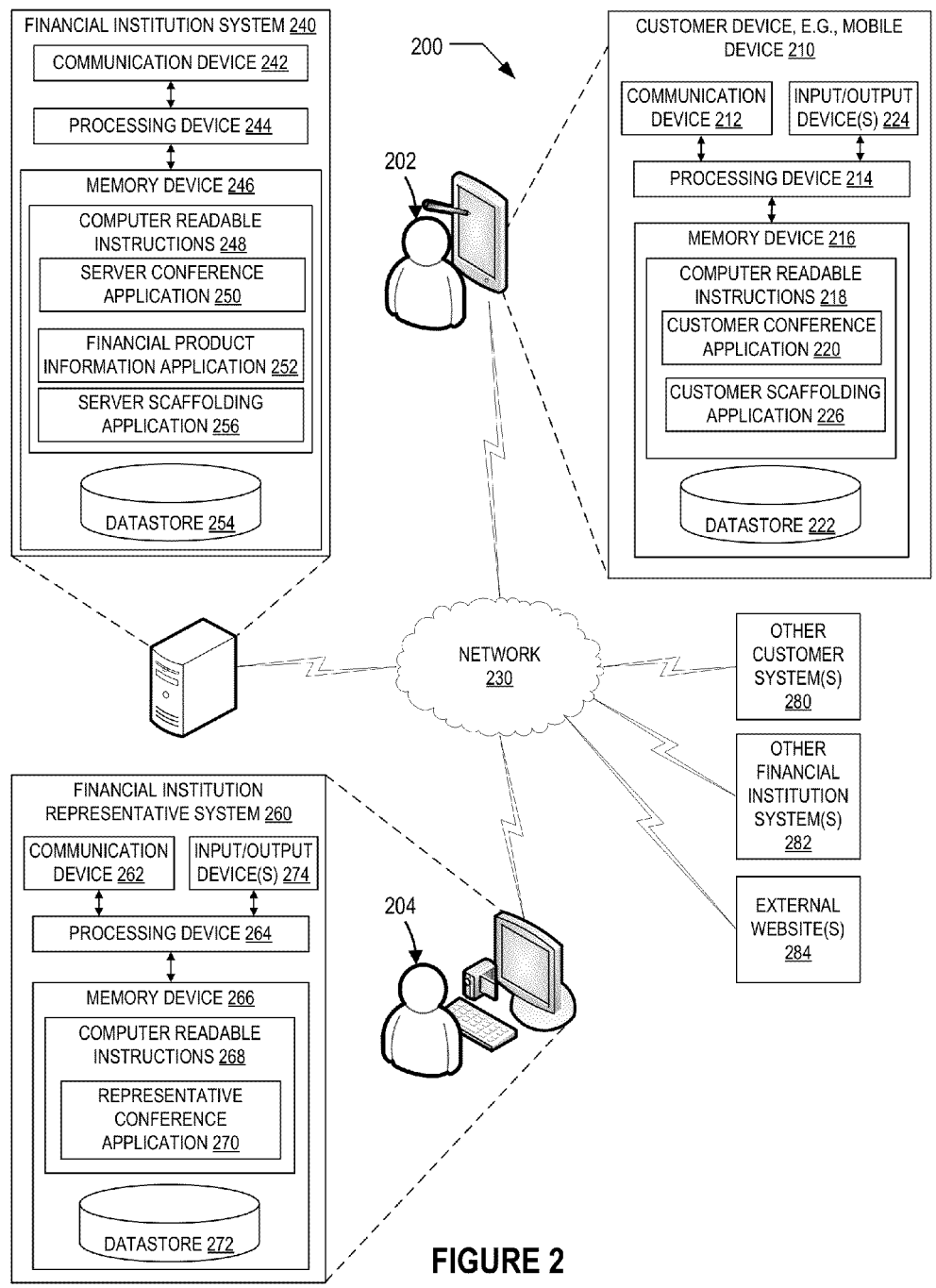

FIG. 2 is a block diagram illustrating an environment wherein a customer participates in a conference with a financial institution representative using a customer device and a financial institution representative system, respectively, in accordance with some embodiments of the present invention.

Figure 3:
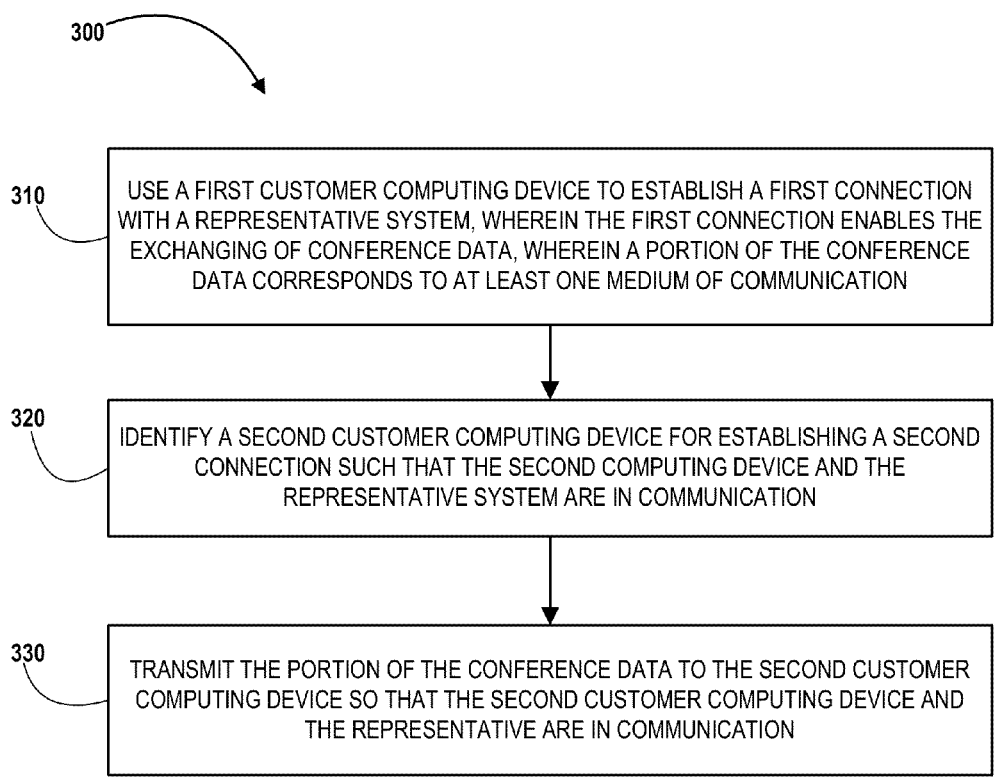

FIG. 3 illustrates a process flow of an embodiment of a method for adaptively scaffolding the levels of connectivity on customer devices during a conference involving a customer and representative, in accordance with some embodiments of the present invention.

Figure 4:
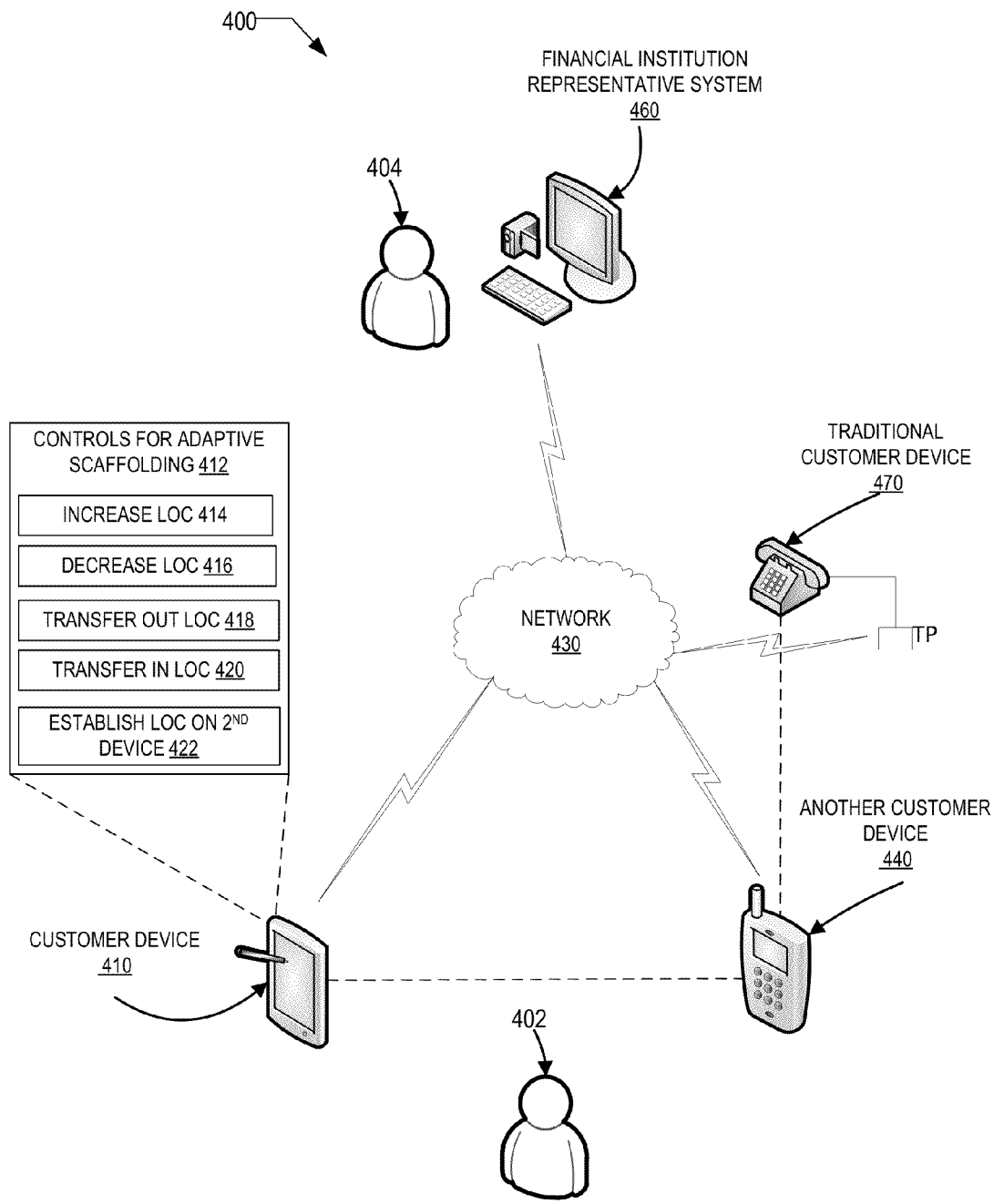

FIG. 4 is a block diagram illustrates an environment wherein a customer participates in a conference with a financial institution representative using a first customer device and a second customer device, in accordance with some embodiments of the present invention.

DETAILED DESCRIPTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout. Although the embodiments of the invention described herein are generally described as involving a "bank," one of ordinary skill in the art will appreciate that other embodiments of the invention may involve other financial institutions, or businesses outside of financial institutions, that utilize customer representatives, call centers, or other comparable systems.

Embodiments of the invention enable customers to interact with financial institution representatives over video conferencing and/or audio conferencing using a conferencing application running on, for example, a financial institution server and/or the customer's notebook computer. The variety of features may provide a customer an unprecedented balance of convenience, personalization, and exceptional customer service. Before or at the beginning of a call, a customer is given a set of representatives. The customer may select a representative based on information provided about the representatives such as their numbers of years of experience. While the customer is waiting for the call to commence, the customer may be provided information indicating the wait time until the call commences and may be given relevant information or links to information using the conference application, such as by a split screen showing relevant information as well as hold time information. In some cases, the customer is given an opportunity to play games or navigate the Internet for topics unrelated to the topic of the call. Once on a call, customers are given an opportunity to view and edit documents related to the call. In some instances, customers may collaborate on document creation and modification with the representative and the representative (or customer) may be able to point out sections of relevant documents to the customer such as by highlighting or inserting notes. The conferencing application may also generate an electronic call summary that may be specialized for the representative or the customer. This call summary may record the spoken words and convert them to text and correlate the text with the other interactions between the customer and the representative, for example, noting within the call log that the representative presented the customer with a specific document at a particular point in the conversation. The conferencing application may enable a customer to schedule a future conference with a representative with whom the customer has previously interacted (referred to as a "primary representative") or with a representative recommended by the primary representative. In some situations it may be advantageous for the conference to switch devices and/or include additional participants, so the conference application provides the customer flexibility in forwarding the call to other devices or back to the original device and/or inviting other participants onto the call.

Referring now to FIG. 1, a flowchart illustrates a process flow 100 representing the fundamental stages of a customer's interaction with the financial institution. These stages were discerned through a significant customer research project. The first stage of customer interaction, at Block 110, is the customer is triggered to contact the financial institution. Typically, the customer has a question about a financial product such as a product the customer is considering or a product the customer already owns. Whatever triggers the customer to initiate contact with the financial institution provides context for the conference regarding subject matter and may also provide the environment and circumstances surrounding the customer. Accordingly, various embodiments of the conferencing application were designed to address the needs and concerns of those customers who initiate conferences with the financial institution based on triggers. In order to maximize the customer experience and satisfaction with the conference application, and based in part on the triggers to the customer, the conference application, in some embodiments, ensures that the customer can make a personal connection with one or more financial institution representatives who may be able to provide expert advice to the customer regarding complex products or issues over a private and secure platform that overcomes common challenges to existing video technologies.

The next stage of customer interaction, at Block 120, is the customer initiating a conference with the financial institution using the conference application. The customer, having been triggered by an interest in a product or a question about a product or otherwise, may want to speak with a customer service representative. The customer, however, may not want to take the time to physically visit a brick and mortar financial institution location. The conference application provides an alternative to visiting a physical location along with numerous advantages to doing so such as the ability to electronically create and edit documents in collaboration with a representative.

In order to initiate a conference, a customer may use a customer device such as a computing device like a computer (desktop, laptop, tablet or the like), a smartphone or other computing device as represented by computing device 210 of FIG. 2. It will also be understood that the conference may be initiated and/or conducted over an in-vehicle (e.g., car, boat, plane, and/or the like) audio and/or video system and/or subsequently transferred to another customer device, such as a tablet upon exiting the vehicle. The computing device may have a conference application installed in its memory. The conference application may also be installed and running on one or more financial institution servers such that customers running the conference application on a customer device can communicate with the conference application running at the financial institution. The conference application for the customer device may be the same or different than the conference application running on the financial institution servers.

The conference application provides the customer an opportunity to select a representative with whom to speak in some embodiments. Several representatives may be presented to the customer in a list of representatives. In some embodiments, each of the representatives are presented by display of a still, moving, and/or live picture of the representative as well as some information about the representative. In some cases, the representative's professional qualifications and experience are presented to the customer for consideration, and in some cases, additional information about the representative is presented. For example, personal interest information may be presented, for example, the representative's hobbies, location, and favorite sports teams or favorite television shows may be presented to the customer for consideration. Once the customer has selected a representative to speak with, the application places the customer "on hold" for an immediate conversation with the representative or may present the customer with a date and time in the future for scheduling a call with the representative. The application may then remind the customer of the scheduled call in a variety of ways, such as using electronic calendar entries, alarms and the like. Either prior to an immediate call or a scheduled call, the customer may input some pre-call information to provide context for the call with the representative.

In some cases, such as for a premier customer, the application may provide all of the financial institution representatives assigned to the customer or with whom the customer has previously spoken. For example, the loan officer, the financial planner, the personal banker and the like associated with the customer may be provided to the customer for selection during the pre-conference representative selection. The application may also rank the representatives (either or both of assigned representatives and representatives previously spoken with) based on customer input, experience in relevant field or otherwise.

While the customer is on hold waiting for a conference call, the customer may be presented with one or more time consuming options while holding. The customer may be presented with information regarding the customer's wait until the connection with a live representative is made, such as a visual depiction of the queue of customers waiting for customer service related to, for example, a specific category of assistance or a specific representative. The visual depiction may also include information related to the time to connection and may include a "snooze" virtual button or other virtual input mechanism that receives customer input indicating the customer's desire to postpone the live connection with the representative. During the hold, the customer may be presented with informational videos relevant to the upcoming call. In some instances, the videos may be recordings of the representative for whom the customer is waiting or another representative familiar to the customer. Similarly, the customer may be presented with a widget or a portion of the application screen, such as a portion of a split screen for performing onsite research or offsite research, providing games to play while waiting, providing a data consumption bar during the hold as well as during the call, providing choices for connection speed (and possibly quality of video/audio, providing a listing of documents necessary and/or useful for the call and the like. In some instances, a widget or split screen portion is provides access to the financial institution's online banking platform so that the customer may access information regarding his or her accounts maintained by the financial institution.

Referring again to FIG. 1, the next stage of customer interaction, at Block 130, is the customer participates in a conference with one or more financial institution representatives using the conference application. During the conference, the customer may be provided with various functions for improving the conference experience, for example, document sharing, visual navigation, video chat and call controls and multiple participants.

The application may present to the customer persistent call controls, such as for accessing an on demand customer service connection or other representative connection. An interface of the application may provide the customer an opportunity to highlight or select portions of text or graphics presented on the interface, such as highlighting portions of documents that are being discussed between the customer and the representative. The control of these shared documents may be retained by the representative or may be with the customer or both. The representative may direct the discussion away from a standard document to something more interactive such that the customer may have the ability to access portions of the document and enter/change information in the document. In some instances, the application may allow the customer and the representative to switch control of the document back and forth as necessary during the conference.

During a conference, a customer and/or a representative may need to bring one or more other people into the conference. This may be done by the customer, for example, by the customer vouching for the additional participant and, in some embodiments, verifying the additional participant electronically. In some cases, credentialing of the additional participant is by a verification process. When an additional representative is required on the conference, an interaction log may be provided to the new associate to bring him or her up to speed quickly. The customer may have a trusted group of representatives who may be quickly brought into a conference. If the customer has not interacted with a particular representative before, the customer may provide a confirmation of acceptance of a representative, based on pre-existing filters, review of provided representative information or the like.

In some embodiments, during a conference using the application, a customer is given an opportunity to promote and/or demote levels of connectivity. For example, the customer may choose to change from textual to audible to visual to audio-visual interaction with the financial institution representative and/or the opposite. Such channel hopping may be logged, such as in an interaction log. Also, the customer may auto-forward a connection initiated from a representative from one device to another device, such as from the customer's tablet computer to a smartphone. In some cases, the customer may forward the connection back to the original device or use a cross- and/or dual-channel presentation. For example, audio of the conference may be presented using one device and video may be presented using another device.

At Block 140, the customer and/or the representative concludes the conference and the conference application may perform one or more post-conference actions. For example, an e-receipt (also called an interaction log) may be finalized. The interaction log may have been created automatically by the application during the conference and may include a recording and/or a textual representation of the words spoken during the conference. The interaction log may but used by the customer and/or the representative as a record of the call and the information/document shared during the call. From the perspective of the customer, the log may be used as a reference when completing tasks after the call has ended such as gathering or completing additional documents or following up as necessary. In addition to voice recordings and written text, the log may include, for example, copies of documents discussed, links to other information, highlighting and or notes taken during the call, and possibly timestamps indicating when in the call various actions occurred or documents were reviewed/highlighted and the like. The log may incorporate manual input as well. For example, the log may accept confirmation of portions of a conversation from one or both participants. In some instances, one or both participants may be able to remove unnecessary or repetitive portions of the log as desired. The log may include inset indications of highlighting of interface items and/or documents discussed during the conference. The participants of the conference may have different versions of the log, such as versions allowing the customer to comment/edit within the log manual and versions allowing the representative to comment/edit within the log manually.

In some embodiments, after the call has been completed archives of the interaction log and any documents discussed, created, edited or otherwise are stored by the financial institution and/or by the customer device (for offline access). These documents may be retrieved by the customer, such as by using the application or by logging into the customer's online banking website portal. In some embodiments, the application prompts the customer whether to store one or more of the log and/or the other document(s) discussed and prompts the customer regarding the storage location. In some embodiments, the customer is also given the option of communicating the log and/or other documents to one or more electronic destinations such as to one or more email addresses or the like.

Referring now to FIG. 2, a block diagram illustrates an environment 200 wherein a customer 202 participates in a conference with a financial institution representative 204 using a customer device 210 and a financial institution representative system 260, respectively. The environment also may include a financial institution system 240, other customer systems 280, other financial institution systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other financial institution applications such as the customer conference application 220, the customer scaffolding application 226, and/or the online banking application (not shown). The customer device 210 may be or include a computer system, server, multiple computer system, multiple servers, or some other computing device configured for use by a user, such as a desktop, laptop, personal digital assistant (PDA), tablet, or a mobile communications device, such as a smartphone. In some embodiments, the customer device 210 is configured to send and/or receive communications (e.g., phone calls, text messages, actionable alerts, emails, social media-specific messages, and/or the like), present information via a user interface, play video games, and/or the like. The customer device 210 has a communication device 212 communicatively coupled with a processing device 214, which is also communicatively coupled with a memory device 216 and one or more input and/or output devices 224, for example, an image capture device such as camera and/or a microphone. In some embodiments, the communication device 212 of the customer device 210 includes one or more NFC interfaces that are configured to communicate with one or more NFC interfaces associated with the customer 202. For example, in some embodiments, where the customer device 210 is embodied as a mobile phone, the mobile phone has an NFC interface that can communicate conference data and/or one or more levels of connectivity of a conference session to and/or from the NFC interface of another device. The processing device 214 is configured to control the communication device 212 such that the customer device 210 communicates across the network 230 with one or more other systems, for example, the financial institution representative system 260. The processing device 214 is also configured to access the memory device 216 in order to read the computer readable instructions 218, which in some embodiments include a customer conference application 220, a customer scaffolding application 226, and online banking application 228. The memory device 216 also may have a datastore 222 or database for storing pieces of data for access by the processing device 214.

The customer scaffolding application 226, when executed on the customer device 210 during or prior to a conference session, is configured to allow customer 202 to selectively transmit, transfer, or forward at least a portion of the conference data that is being exchanged during the conference session. In this way, the customer may choose to transmit to another customer device at least one level of connectivity (e.g., one medium of communication, such as audio, video, and/or the like) corresponding to a portion of the conference data. As referred to herein, a "level of connectivity" may include any medium or means of communicating electronically between computing devices that may include, but is not limited to, audio communication, video communication, textual communication, code communication, tactile communication resulting from electrical signals, multimedia communication, internet communication, any other medium of communication for exchanging content electronically, and/or any combination of the fore-mentioned examples of mediums of communication and/or that is a format for the content of an electromechanical communication. For example, in some embodiments, the customer 202 may be conducting a conference session with a representative 204 on a tablet computing device, where the conference session on the tablet computing device has, at least, two levels of connectivity, such as an audio and visual connection with the computer system of the representative 204. In such an example, the customer 202 may selectively choose to transfer the visual connection of the two levels of connectivity to another customer device, such as a mobile smart phone of the customer 202. In this way, once the audio portion of the levels of connectivity of the conference is transferred to the mobile smart phone, the customer 202 may listen to the audio portion of the conference session on her smart phone and watch the video portion of the conference session on the display of her tablet computing device. The customer 202 may transfer any portion of the levels of connectivity, including all the levels of connectivity, to and/or from any other computing device and is not limited to the example described above. For example, the customer 202 may transfer the video to her mobile smart phone and maintain the audio portion of the levels of connectivity on her tablet computing device. In some embodiments, the customer 202 may use the application 226 to transfer more than one level of connectivity to another customer device. In another embodiment, the customer 202 may use the customer scaffolding application 226 to forward some or all the levels of connectivity transferred to a second customer device back to the customer device 210 such that the customer device 210 that may have originated the conference session has at least one level of connectivity for conducting the conference session. In other embodiments, the customer 202 may use the customer scaffolding application 226 to consolidate the levels of connectivity among different customer devices 210. For example, a customer 202 may begin a conference session with a representative 204, via his smart phone, and upon accessing his tablet computing device to establish a video level of connectivity with the representative 204 while continuing an audio conversation with the same representative 204. In such an example, using the customer scaffolding application 226, the customer 202 can move the audio portion of the conference session on his smart phone to the tablet computing device in order to consolidate the levels of connectivity to the tablet computing device. The levels of connectivity during a conference session between a user 202 and a representative 204 may include any mediums of communicating between two computing devices.

In some embodiments, the customer scaffolding application 226, when executed on the customer device 210, during a conference session on the customer device 210 involving the customer 202 and representative 204, automatically presents a prompt to the user (without human intervention), in response to detecting another customer device, regarding establishing or transferring a level of connectivity to the detected another customer device. In this way, the customer 202 merely responds to and/or selects the prompt and either a predetermined or selected level of connectivity of the conference session is transferred to the detected another customer device. For example, during a conference session between the customer and representative of a financial institution on the customer's mobile smart phone, the customer scaffolding application 226 on the mobile smart phone detects another customer device, such as a tablet computing device. In such an example, the scaffolding application 226 being executed on the smart phone or tablet computing device would present a prompt on the display of the mobile smart phone and/or the tablet computing device where the prompt comprises information stating or asking whether the customer would like to establish or transfer a level of connectivity of the conference session. It will be understood that, in some embodiments, the system does not have to detect another device in order to present the prompt to the customer. In some embodiments, the prompt is displayed based on user activity during a conference session. It will be understood that the customer device 210 may detect another customer device in any way or manner, for example, based on determining the proximity of another customer device, receiving a signal from the another customer device, the customer indicating that the another customer device is available, and/or the like. The customer scaffolding application 226 may be configured to automatically prompt the user to establish a level of connectivity of a present or current conference session based on past customer conference sessions stored in a datastore, customer preferences for conferencing related to the timing for establishing and/or for transmitting a level of connectivity to another device, and/or customer conference rules not determined by the customer 202.

In some embodiments, the customer scaffolding application 226, when executed on the customer device 210, during a conference session involving the customer 202 and representative 204, allows the customer to forward a portion or all of the conference data corresponding to at least one level of connectivity to a another customer device based on the hand motions or by the customer 202 touching the display of the customer device 210 and swiping the at least one level of connectivity towards another customer device. For example, during a conference session involving the customer 202 and representative 204, the customer 202 may select the audio level of connectivity of the conference session by touching the display of customer device 210 and by swiping towards the right of the display of customer device 210, the audio level of connectivity is forward to another customer device located to the right of customer device 210 such that the customer 202 may listen to the audio portion of the conference session on the another customer device.

In some embodiments, the customer scaffolding application 226, when executed on the customer device 210, during a conference session on the customer device 210 involving the customer 202 and representative, may automatically forward (without human intervention and independent of a request from the customer 202) a portion or all of the levels of connectivity of a conference session being conducted on a first customer device 210 to a second or more customer devices. In this way, the customer 202 does not have to acknowledge a prompt or perform any actions to establish a new level of connectivity and/or transfer a portion or all of the levels of connectivity of a conference session on her customer device 210 to a second or more customer devices. As an example, during a conference session between the customer and bank representative on the customer's mobile smart phone, the customer scaffolding application 226 on the mobile smart phone automatically establishes and/or forwards a portion or all of the levels of connectivity of a conference session on the customers mobile smart phone to a tablet computing device and a personal desktop computer. In such an example, the scaffolding application 226 automatically forwards or establishes the levels of connectivity based at least in part on pre-established customer preferences that may be related to the timing of forwarding the connections, previous conference sessions involving the customer and the representative or another representative, and/or detecting another customer device, and/or the like.

The customer scaffolding application 226, in some embodiments is configured to present, during and/or contemporaneously with a conference session involving the customer 202 and representative, on a display of the customer device 210 one or more tools or features, as shown in FIG. 4, that may be useable by customer 202 for manipulating the levels of connectivity during the conference session. In such an embodiment, the customer 202 may select the one or more tools or features in any way or manner, including by inputting a voice command to an input device in communication with customer device 210, by typing a command, touching the area of the display of customer device 210 that displays the one or more tools or features, and/or the like.

In some embodiments, the customer 202 may use the customer scaffolding application 226 to promote and/or demote levels of connectivity during a conference session involving the customer 202 and a representative 204. As an example, during a conference session involving a representative, the customer 202 may select a selectable input feature on customer device 210 that changes an audible channel of communication (e.g., the customer and representative can only hear each through spoken communication on their respective devices) to only a visual channel of communication. Alternatively, the customer 202 may select to change an audio-visual channel of communication with the representative to a textual channel of communication, where the entire communication between the customer 202 and representative is presented only in text on, at least, the display of customer device 210 of the customer 202. It will be understood that the customer 202 can manipulate the channels of communication or levels of connectivity in any combination; the fore-mentioned examples are not intended to limit the capabilities of the customer 202 to switch between channels of communication. As another example, a customer 202 may be in queue for a video conference with a representative 204, while in queue the representative 204 may initiate communication with the customer 202 using a text only form of communication, such as chat messaging, for indicating his or her present status, and within the chat window, within the message, or using the chat interface the customer may promote the levels of connectivity to include audio and video levels of connectivity once the customer 202 and/or the representative 204 are ready to commence the video conference. Some additional examples of switching between channels of communication include switching from text to audible, text to visual, audible to text, audible to visual, visual to text, visual to audible, audio-visual to audio-textual, visual-textual to visual-textual, audio-textual to visual, and the like.

In some embodiments, the customer 202 activity of manipulating the channels of communication (e.g., channel hopping, channel switching, switching levels of connectivity, and the like) during the conference session involving the customer 202 and the representative may be captured as data and logged, such as in a conference session log and/or representative service log. The representative service log may be used by the server scaffolding application 256 of financial institution system 240 to learn the customer's behavior during a conference session so that the server scaffolding application 256 may dynamically manipulate the channels of communication and/or levels of connectivity by promoting and/or demoting levels of connectivity and/or transferring in/out levels of connectivity to and/or from another customer device in a present or future conference session involving the customer 202 and representative.

An online banking application (not shown) allows customer 202 to access his/her account from customer device 210 located anywhere that has access to the network 230. The online banking application allows customer 202 to search, research, apply, and sign-up for products and services offered by the financial institution associated with online banking application. In some embodiments of the invention, the customer 202 can use the customer conference application 220, which in some embodiments work in conjunction with or via the online banking application and the customer scaffolding application 226 or other applications and systems, to communication with a representative 204, over the Internet.

The financial institution representative system 260 may be a workstation used by a representative to communicate with customers using the conference application. In some embodiments, the financial institution representative system 260 may communicate with one or more of the other systems or devices and may perform one or more steps and/or one or more methods as described herein. In some embodiments, the financial institution representative system 260 includes a communication device 262 communicatively coupled with a processing device 264, which is also communicatively coupled with a memory device 266 one or more input and/or output devices 224, for example, an image capture device such as camera and/or a microphone. The processing device 264 controls the communication device 262 such that the financial institution representative system 260 communicates across the network 230 with one or more other systems or devices. The processing device 264 is also configured to access the memory device 266 in order to read the computer readable instructions 268, which in some embodiments include a representative conference application 270 having instructions for communicating with the customer conference application 220 and customer scaffolding application 226 running on the customer device 210 and/or the server conference application 250 server scaffolding application 256 running on the financial institution system 240. In some embodiments, the financial institution representative system 260 includes one or more datastores 272 for storing and providing one or more pieces of data used by the representative during conferences with customers.

A financial institution system 240 is a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a server conference application 250, and/or a server scaffolding application 256, and/or an online banking application 258. The memory device 246 also has a datastore 254 or database for storing pieces of data for access by the processing device 244. In some embodiments, the representative conference application interacts with the server conference application to access information, document or other data for use during a conference call. In some embodiments, a financial product information application 252 retrieves information regarding financial products being discussed during a call between a customer and a representative and provides the information to the customer and/or the representative during the call and/or after the call has ended.

The applications 220, 250, 256, 258, and 270 are for instructing the processing devices 214, 244 and 264 to perform various steps of the methods discussed herein, and/or other steps and/or similar steps. In various embodiments, one or more of the applications 220, 250, 256, 258, and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with a representative through network 230. In various embodiments, the applications 220, 250, 256, 258, and 270 stored and executed by different systems/devices are different. In some embodiments, the applications 220, 250, 256, 258, and 270 stored and executed by different systems may be similar and may be configured to communicate with one another, and in some embodiments, the applications 220, 250, 256, 258, and 270 may be considered to be working together as a singular application despite being stored and executed on different systems. In some embodiments, the applications 220, 250, 256, 258, and 270 stored and executed by the customer device and/or an application stored and executed on one of the other systems is a stand-alone application 220 and does not necessarily communicate or rely on any other applications for data, processing or otherwise, except for providing a connection with a representative through the application 270.

The server scaffolding application 256 on the financial institution system 240, in some embodiments, when executed, is configured to learn the behaviors and/or preferences that the customer 202 demonstrates during past and/or present conference sessions with a representative 204 of the financial institution so that server scaffolding application 256 dynamically manipulating the levels of connectivity and/or mediums of communication of the conference session involving the customer 202 and the representative 204. In some embodiments, the server scaffolding application 256 automatically (without human intervention and/or independent of a request by the customer 202 or representative) adjusts the levels of connectivity during a conference session involving the customer 202 and the representative 204. The server scaffolding application 256 is configured to learn the behaviors and/or preferences of the user based at least in part on, but not limited to datasets related to the customer 202 and the past behaviors of the user on prior conference sessions with a particular representative or other representative. Examples of user's past behaviors may include, the user switching from a first device to a second device, enabling a first device for video interaction with a representative while enabling audio for the video interaction on a second device, enabling textual on a device while interacting with a representative using video, and all these previously-mentioned exampled behaviors occur during and or contemporaneously with a conference session with a representative. The server scaffolding application 256 may dynamically and/or automatically adjust the levels of connectivity during a conference session in real-time or substantially real-time.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the financial institution representative system 260, the other financial institution systems 282, and/or any other system or component used in conjunction with or to perform any of the method steps discussed herein.

In various embodiments, the financial institution system 240, the customer device 210, the financial institution representative system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

Referring now to FIG. 3, illustrates a process flow of an embodiment of the invention for adaptively scaffolding the levels of connectivity on customer device(s) during a conference session involving a customer 202 and representative 204. In some embodiments, the process flow 300 is performed by a system having an apparatus (i.e., one or more apparatuses) having hardware and/or software configured to perform one or more portions of the process flow 100. In such embodiments, as represented by block 310, the system is configured to use a first customer computing device to establish an operative connection with a representative system such that the customer 202 and the representative 204 may conduct a conference. The establishing the connection allows the customer to either initiate or continue a conference session with a representative system in order to discuss, explore, and/or resolve issues related to products and/or services associated with and/or offered by a financial institution associated with the representative system. The first customer computing device may be any device capable of establishing communication with a representative system including a smart phone, tablet computer, PDA, gaming console, mobile gaming console, and/or the like.

As used herein, an operative connection means a connection that operates to connect at least two devices. The operative connection may be wired or wireless. Data and information may be transferred over the operative connection such that the at least two devices are in communication. For example, the user may request a conference over the Internet. The user may begin establishing a connection between the user's device and a device at the financial institution. In some embodiments, the user logs into the user's account at the financial institution, such as on a webpage or application, in order to establish an operative connection between the user's device and the financial institution. In some embodiments, the user establishes the operative connection based on a network connection. For example, the user may have access to a secure connection and therefore be able to establish the operative connection. In an embodiment, the user's device is required to have security software so that the operative connection has an enhanced level of security. For example, the operative connection may be encrypted so that the conference can only be accessed by devices and/or individuals having permission to access the conference.

As represented by block 320, the system is further configured to identify a second customer computing device for establishing a second connection with the representative system. The system may identify the second customer computing device in any manner including by detecting the presence of the second customer computing device due to the second customer computing device's proximity to the first customer computing device, by receiving a signal from the second computing device where the signal may be in response to a prior signal sent by the system or first computing device, by receiving a tap from the second customer computing device, by receiving input from the customer 202 indicating that the second computing device is available for a connection, and/or the like. The second computing device may in any manner be linked to the first customer computing device and/or the system 200, such as via a LAN, GAN, WAN, wireline, wireless, Bluetooth, and/or any other type of connection. In some embodiments, the first and/or the second customer computing devices are registered to a server and/or system that indicate that the first and second customer computing devices are associated with the customer 202. In this way, the system may automatically (without customer input), during a conference session involving the first customer computing device, search for and/or identify the second customer computing device as being eligible and/or available for a connection during the conference session. In response to identifying the second customer computing device, the system may automatically establish a connection with the second computing device in order to transmit a portion or all of the levels of connectivity of the conference session involving the first customer computing device to the second customer computing device. In some embodiments, this connection is initiated automatically and the customer is prompted, on the first and/or second customer computing device(s) for confirmation of the user's desire to transfer some or all of the connection.

As represented by block 330, the system is also configured to transmit the portion of the conference data corresponding to the at least one medium of communication to the second customer computing device so that the second customer computing device and the representative system are in communication based at least partially on the identifying the second customer computing device. The system having process flow 300 may transmit the portion of the conference and/or all of the conference in any way or manner including using near field communication device (NFC), wireless Internet, and/or the like. For example, in one embodiment, the system may transmit the portion of the conference and/or all of the conference by transmitting some indicia, such as a token, either together with the transmission of the portion of the conference, separately from the portion of the conference, or contemporaneously but separately from the transmission of the portion of the conference such that the token authenticates the second customer device and/or allows for the transmission to continue on the second customer device. The transmission and/or token transfer may occur through some wireless communication medium, such as Wi-Fi, near field communication device or tap from an NFC device, or via a paired Bluetooth customer device. The transmission of the portion or all of the conference data may originate from the first computing device, the representative's system, a server of the financial institution, or any other device in communication with the network, and/or the like. For example, in some embodiments, during a conference session involving the customer 202 and representative 204 conference data having at least an audio level of connectivity and a visual level of connectivity is transmitted to the customer device 210 from the representative system 240. In such an example, when the system establishes a second connection with another customer device, the representative system 240 may transmit to the another customer device the portion of the conference data including the audio and/or visual levels of connectivity. In another example, the customer device 210 transmits a portion of the conference data to the another customer device based on establishing a second connection with another customer device.

In addition, the apparatus and/or system configured to perform the process flow 300 can be configured to perform any of the portions of process flow 300 represented by blocks 310-330 or any other embodiments described herein upon or after one or more triggering events (which, in some embodiments, is one or more of the other portions of process flow 300). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the system configured to perform the process flow 300 is configured such that the system identifying the second customer computing device (the triggering event) automatically and immediately or nearly immediately (e.g., within 1-30 second, and/or the like) triggers the system to establish a second connection with the second customer computing device (the triggered action). In some embodiments, the system is additionally or alternatively configured to transmit the portion of the conference data corresponding to the at least one medium of communication (triggered action) automatically and immediately or nearly immediately after establishing the second connection (triggering event). Further in addition, it will also be understood that the system having process flow 300 can be configured to perform one or more portions of the process flow 300 in real time, in substantially real time, and/or at one or more predetermined times.

Referring now to FIG. 4, a block diagram illustrates an environment 400 wherein a customer 402 participates in a conference involving customer 402 and representative 404 using representative system 460 and using a first customer device 410 and a second customer device 440. The environment may also include any and all the devices described in FIG. 2 and/or described herein. The systems and devices communicate with one another over a network 430 and perform one or more of the various steps and/or methods according to embodiments of the invention discussed herein.

As illustrated in FIG. 4, a customer 402 during a conference session with representative 404 establishes a first connection with customer device 410 and a second connection with another customer device 440, where both devices are in communication with the representative system 460 over the network 430. In some embodiments, the customer 402 initially conducts the conference session with representative 404 over only one customer device 410 and during the conference session, customer 402 may select the transfer out the level of connectivity ("LOC") 418 feature on the controls for adaptive scaffolding 412 for transferring a portion and/or all of the conference data being exchanged during the conference. In one embodiment, the customer 402 may have initiated a conference on a customer device 410 and subsequently transfer either a portion and/or all the levels of connectivity to a traditional customer device 470, such as a home telephone. In such an instance, the home telephone may be connected to the network 430 via a telephone jack in a wall and/or a router.

The controls for adaptive scaffolding 412 is presented on the display of customer device 410 and includes at least increase LOC 414 for promoting the level of connectivity on either customer device, decrease LOC 416 for demoting the level of connectivity on either customer device, transfer out LOC 418 for transferring out either a portion or all the conference data from customer device 410 to another customer device 440, transfer in LOC 420 for transferring in a portion or all the conference data from another customer device 440 to customer device 410, and establish LOC on $2^{nd}$ device 422 for identifying a second device, such as another customer device 440 in order to establish another connection for conferencing.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

This application incorporates by reference in their entirety each of the following applications filed concurrently herewith:

U.S. application Ser. No. 13/651,966, entitled SYSTEM PROVIDING AN INTERACTIVE CONFERENCE filed Oct. 15, 2012 to Matt Calman et al.;

U.S. application Ser. No. 13/652,120, entitled PROVIDING A RECORD OF AN INTERACTIVE CONFERENCE, filed Oct. 15, 2012 to Matt Calman et al.;

U.S. application Ser. No. 13/651,674, entitled FUNCTIONALITY DURING A HOLD PERIOD PRIOR TO A CUSTOMER SERVICE VIDEO CONFERENCE filed Oct. 15, 2012 to Matt Calman et al.;

U.S. application Ser. No. 13/651,970, entitled SPLIT-SCREEN PRESENTATION OF FUNCTIONALITY DURING A HOLD PERIOD PRIOR TO A CUSTOMER SERVICE VIDEO CONFERENCE, filed Oct. 15, 2012 to Matt Calman et al.;

U.S. application Ser. No. 13/652,326, entitled MULTIPLE-PARTICIPANT CUSTOMER SERVICE CONFERENCE, filed Oct. 15, 2012 to Matt Calman et al.;

U.S. application Ser. No. 13/652,093, entitled REPRESENTATIVE SELECTION FOR CUSTOMER SERVICE CONFERENCE, filed Oct. 15, 2012 to Matt Calman et al.; and U.S. application Ser. No. 13/652,175, entitled REPRESENTATIVE PRE-SELECTION FOR CUSTOMER SERVICE CONFERENCE, filed Oct. 15, 2012 to Matt Calman et al.

The invention claimed is:

1. A system for conferencing with a representative using one or more customer devices, the system comprising: a communication interface; a network; a processing device operatively connected to the communication interface and the network, wherein the processing device is configured to:

initiate a customer service conference between a customer and a financial institution;

establish a first connection between a first customer computing device and a representative system associated with the financial institution, wherein the first connection enables the customer to interact with a representative of the financial institution to exchange conference data on a first channel of communication;

identify a second customer computing device associated with the customer capable of allowing a connection that enables the customer to interact with the representative of the financial institution on a second channel of communication, wherein identifying a presence of the second customer computing device further comprises identifying a proximity of the second customer computing device to the first customer computing device by receiving a signal from the second customer computing device that was originally sent to the first customer computing device such that the second customer computing device is identified as being associated with the customer;

present the customer with an interface to allow the customer to manipulate a channel of communication and level of connectivity between the first customer computing device and the second customer computing device, including using the first customer computing device to promote and/or demote levels of connectivity during the conference session involving the customer and the representative, wherein the customer selects a feature on the first customer computing device that changes at least the first channel of communication to at least a second channel of communication between the customer and the representative on their respective devices and transfers a portion or all levels of connectivity of the conference session to the second customer computing device that was identified to be in the proximity of the first customer computing device, the at least the first and second channels including an audible, audio-visual, video, audio-textual or a text channel of communication between the customer and the representative on their respective devices;

establish a second connection that enables the customer to interact with the representative of the financial institution on the second channel of communication of the second customer computing device; and transmit a portion of the conference data to the second customer computing device so that both the first customer computing device and the second customer computing device are in communication with the representative of the financial institution such that communication is interchangeable between communication channels of the first customer computing device and second customer computing device.

2. The system of claim 1, wherein the processing device is further configured to:

receive input from the customer for initiating the transmission of the portion of the conference data corresponding to the at least one medium of communication to the second customer computing device.

3. The system of claim 1, wherein the processing device is further configured to:

automatically transmit the portion of the conference data corresponding to the at least one medium of communication to the second customer computer based on pre-established customer preferences.

4. The system of claim 1, wherein the processing device is further configured to:
- add a new medium of communication to the conference data such that the first customer computing device or the second customer computing device is in communication with the representative system in a new way; or
- remove a prior medium of communication existing in the conference data such that the first customer computing device or the second customer computing device can no longer use the prior medium of communication to communicate with the representative system.

5. The system of claim 1, wherein the processing device is further configured to:
- automatically transmit the entire conference data including the portion of the conference data corresponding to the at least one medium of communication to the second customer computing device such that conference data is only exchanged in the second connection and not in the first connection.

6. The system of claim 1, wherein the processing device is further configured to:
- use the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

7. The system of claim 1, wherein the at least one medium of communication comprises at least one of an audio communication, a video communication, a textual communication, image communication, code communication, or tactile communication.

8. A computer-implemented method for conferencing with a representative using one or more customer devices, the method comprising:
providing a computer processor executing non-transitory computer-readable instruction code specifically structured to cause the computer processor to:
initiate a customer service conference between a customer and a financial institution;
establish a first connection between a first customer computing device and a representative system associated with the financial institution, wherein the first connection enables the customer to interact with a representative of the financial institution to exchange conference data on a first channel of communication;
identify a second customer computing device associated with the customer capable of allowing a connection that enables the customer to interact with the representative of the financial institution on a second channel of communication, wherein identifying a presence of the second customer computing device further comprises identifying a proximity of the second customer computing device to the first customer computing device by receiving a signal from the second customer computing device that was originally sent to the first customer computing device such that the second customer computing device is identified as being associated with the customer;
present the customer with an interface to allow the customer to manipulate a channel of communication and level of connectivity between the first customer computing device and the second customer computing device, including using the first customer computing device to promote and/or demote levels of connectivity during the conference session involving the customer and the representative, wherein the customer selects a feature on the first customer computing device that changes at least the first channel of communication to at least a second channel of communication between the customer and the representative on their respective devices and transfers a portion or all levels of connectivity of the conference session to the second customer computing device that was identified to be in the proximity of the first customer computing device, the at least the first and second channels including an audible, audio-visual, video, audio-textual or a text channel of communication between the customer and the representative on their respective devices;
establish a second connection that enables the customer to interact with the representative of the financial institution on the second channel of communication of the second customer computing device; and
transmit a portion of the conference data to the second customer computing device so that both the first customer computing device and the second customer computing device are in communication with the representative of the financial institution such that communication is interchangeable between communication channels of the first customer computing device and second customer computing device.

9. The computer-implemented method of claim 8, wherein the at least one medium of communication comprises at least one of an audio communication, a video communication, a textual communication, image communication, code communication, or tactile communication; and
wherein the computer processor is further executing computer-readable instruction code specifically configured to cause the computer processor to:
receive input from the customer for initiating the transmission of the portion of the conference data corresponding to the at least one medium of communication to the second customer computing device.

10. The computer-implemented method of claim 8, wherein the computer processor is further executing computer-readable instruction code specifically configured to cause the computer processor to:
automatically transmit the portion of the conference data corresponding to the at least one medium of communication to the second customer computing device based on pre-established customer preferences.

11. The computer-implemented method of claim 8, wherein the computer processor is further executing computer-readable instruction code specifically configured to cause the computer processor to:
add a new medium of communication to the conference data such that the first customer computing device or the second customer computing device is in communication with the representative system in a new way; or
remove a prior medium of communication existing in the conference data such that the first customer computing device or the second customer computing device can no longer use the prior medium of communication to communicate with the representative system.

12. The computer-implemented method of claim 8, wherein the computer processor is further executing computer-readable instruction code specifically configured to cause the computer processor to:
automatically transmit the entire conference data including the portion of the conference data corresponding to the at least one medium of communication to the second customer computing device such that conference data is only exchanged in the second connection and not in the first connection.

13. The computer-implemented method of claim 8, wherein the computer processor is further executing computer-readable instruction code specifically configured to cause the computer processor to:

use the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

14. The computer-implemented method of claim 8, wherein the computer processor is further executing computer-readable instruction code specifically configured to cause the computer processor to:

transmit the portion of the conference data corresponding to the at least one medium of communication back to the first connection involving the first customer computing device.

15. A computer program product for conferencing with a representative using one or more customer devices, the computer program product comprising a non-transitory computer-readable medium, wherein the non-transitory computer-readable medium comprises one or more computer-executable program code portions that, when executed by a computer, cause the computer to:

initiate a customer service conference between a customer and a financial institution;

establish a first connection between a first customer computing device and a representative system associated with the financial institution, wherein the first connection enables the customer to interact with a representative of the financial institution to exchange conference data on a first channel of communication;

identify a second customer computing device associated with the customer capable of allowing a connection that enables the customer to interact with the representative of the financial institution on a second channel of communication, wherein identifying a presence of the second customer computing device further comprises identifying a proximity of the second customer computing device to the first customer computing device by receiving a signal from the second customer computing device that was originally sent to the first customer computing device such that the second customer computing device is identified as being associated with the customer;

present the customer with an interface to allow the customer to manipulate a channel of communication and level of connectivity between the first customer computing device and the second customer computing device, including using the first customer computing device to promote and/or demote levels of connectivity during the conference session involving the customer and the representative, wherein the customer selects a feature on the first customer computing device that changes at least the first channel of communication to at least a second channel of communication between the customer and the representative on their respective devices and transfers a portion or all levels of connectivity of the conference session to the second customer computing device that was identified to be in the proximity of the first customer computing device, the at least the first and second channels including an audible, audio-visual, video, audio-textual or a text channel of communication between the customer and the representative on their respective devices;

establish a second connection that enables the customer to interact with the representative of the financial institution on the second channel of communication of the second customer computing device; and transmit a portion of the conference data to the second customer computing device so that both the first customer computing device and the second customer computing device are in communication with the representative of the financial institution such that communication is interchangeable between communication channels of the first customer computing device and second customer computing device.

16. The computer program product of claim 15, wherein the at least one medium of communication comprises at least one of an audio communication, a video communication, a textual communication, image communication, code communication, or tactile communication; and wherein the one or more computer-executable program code portions, when executed by the computer, cause the computer to:

receive input from the customer for initiating the transmission of the portion of the conference data corresponding to the at least one medium of communication to the second customer computing device.

17. The computer program product of claim 15, wherein the one or more computer-executable program code portions, when executed by the computer, cause the computer to:

automatically transmit the portion of the conference data corresponding to the at least one medium of communication to the second customer computer based on pre-established customer preferences.

18. The computer program product of claim 15, wherein the one or more computer-executable program code portions, when executed by the computer, cause the computer to:

add a new medium of communication to the conference data such that the first customer computing device or the second customer computing device is in communication with the representative system in a new way; or remove a prior medium of communication existing in the conference data such that the first customer computing device or the second customer computing device can no longer use the prior medium of communication to communicate with the representative system.

19. The computer program product of claim 15, wherein the one or more computer-executable program code portions, when executed by the computer, cause the computer to:

automatically transmit the entire conference data including the portion of the conference data corresponding to the at least one medium of communication to the second customer computing device such that conference data is only exchanged in the second connection and not in the first connection.

20. The computer program product of claim 15, wherein the one or more computer-executable program code portions, when executed by the computer, cause the computer to:

use the first connection to maintain a second portion of the conference data corresponding to another medium of communication such that after transmitting the portion of the conference data corresponding to the at least one medium of communication to the second connection involving the second customer computing device, both the first customer computing device and the second customer computing device are simultaneously maintaining portions of the conference data involving the representative system.

\* \* \* \* \*